Figure 12:
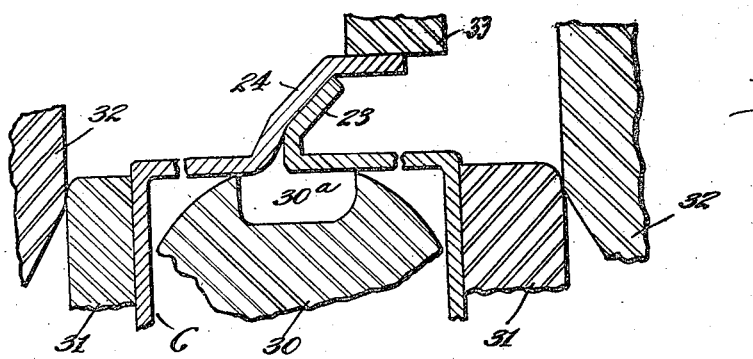

June 24, 1924.
T. N. AIKENS
METHOD OF MAKING TUBULAR SHEET METAL SPOKES FOR WHEELS
Filed Aug. 29, 1921
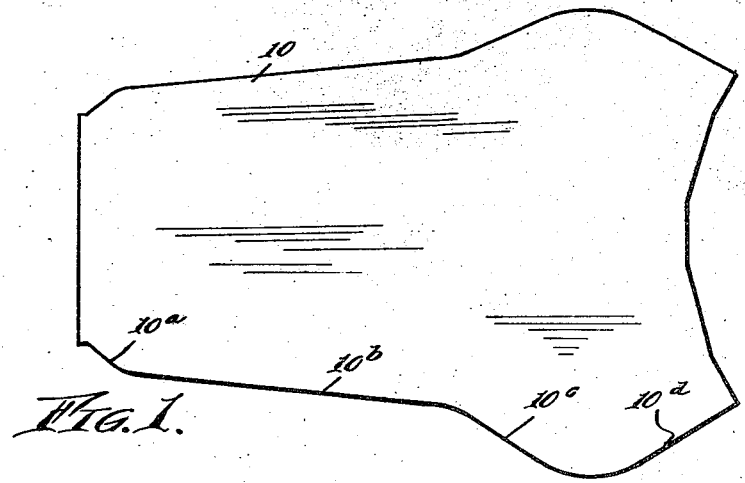
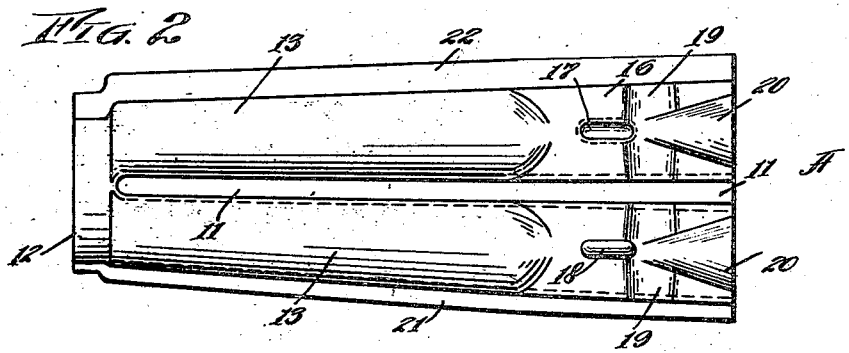
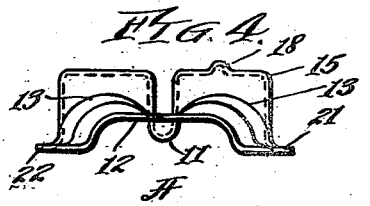
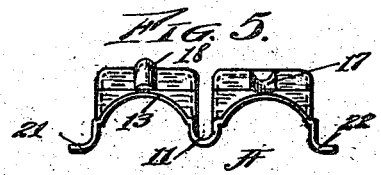

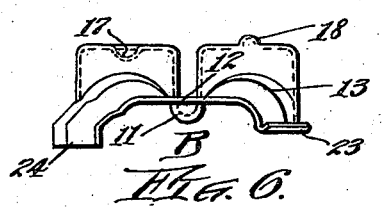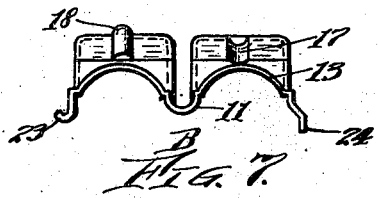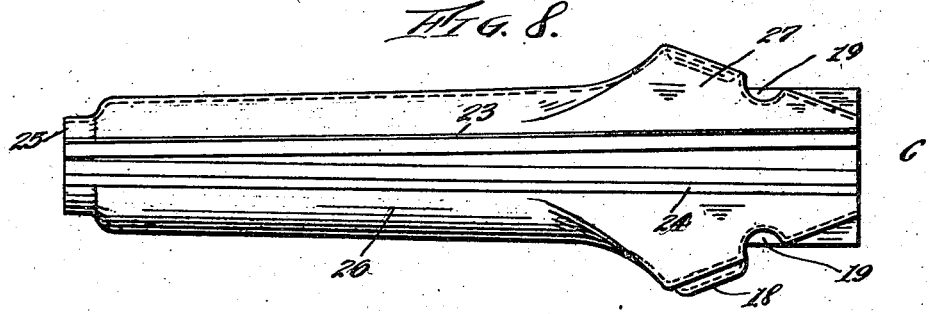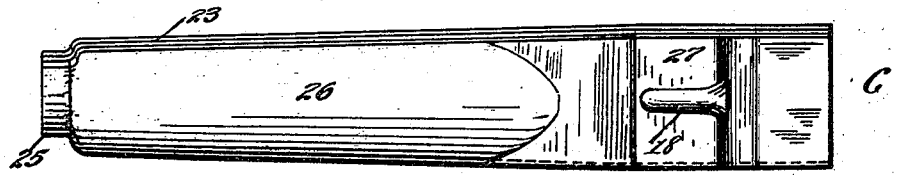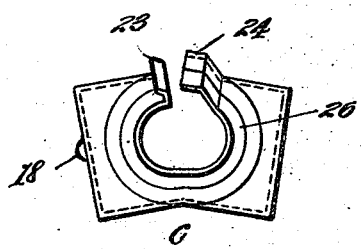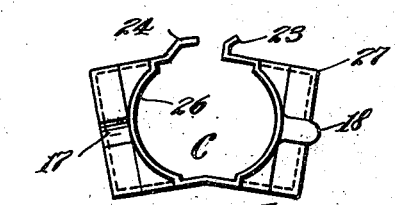

June 24, 1924.  T. N. AIKENS  1,498,771
METHOD OF MAKING TUBULAR SHEET METAL SPOKES FOR WHEELS
Filed Aug. 29, 1921  4 Sheets-Sheet 3

INVENTOR,
Thomas N. Aikens
BY Thurston Kwis & Hudson
ATTYS

June 24, 1924.
T. N. AIKENS
METHOD OF MAKING TUBULAR SHEET METAL SPOKES FOR WHEELS
Filed Aug. 29, 1921 4 Sheets-Sheet 4
1,498,771
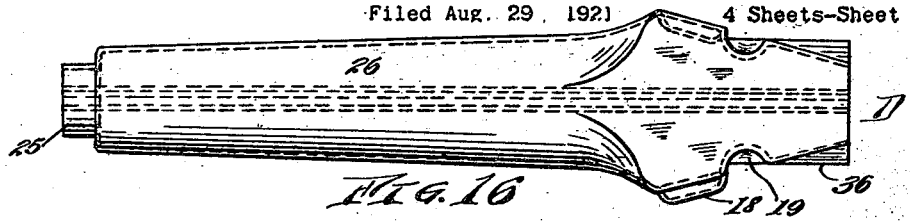
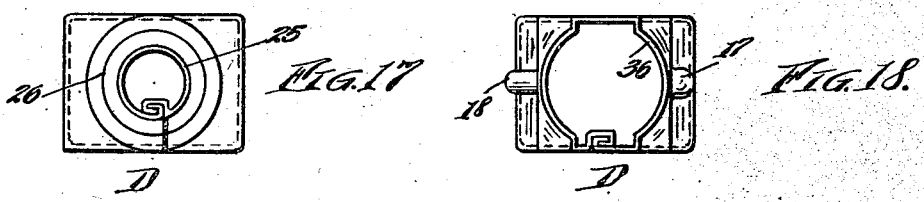
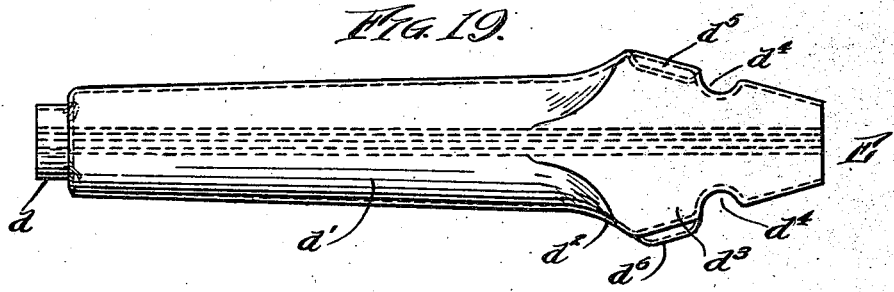
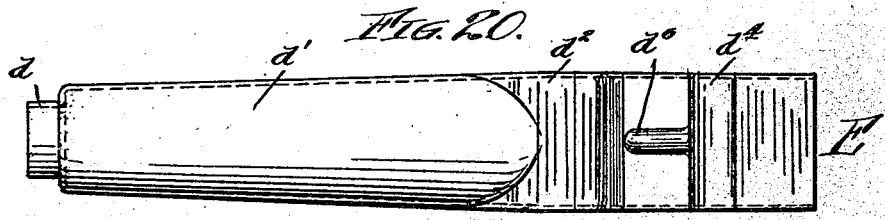
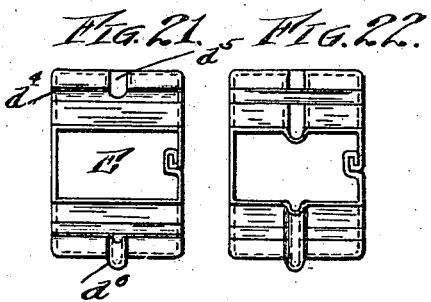
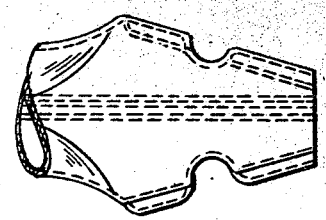
INVENTOR,
Thomas N. Aikens.
Thurston, Kwis & Hudson
ATTYS Patented June 24, 1924.

1,498,771

UNITED STATES PATENT OFFICE.

THOMAS N. AIKENS, OF LAKEWOOD, OHIO, ASSIGNOR OF ONE-HALF TO DAVID D. WALKER, OF LAKEWOOD, OHIO.

METHOD OF MAKING TUBULAR SHEET-METAL SPOKES FOR WHEELS.

Application filed August 29, 1921. Serial No. 496,373.

*To all whom it may concern:*

Be it known that I, THOMAS N. AIKENS, a citizen of the United States, residing at Lakewood, in the county of Cuyahoga and State of Ohio, have invented a certain new and useful Improvement in Methods of Making Tubular Sheet-Metal Spokes for Wheels, of which the following is a full, clear, and exact description.

In my co-pending application, Serial No. 487,292, filed July 25, 1921, I have shown, described and claimed a fabricated steel wheel having spokes, each formed of one piece of sheet metal in tubular form, with the edges of the sheet locked together in the form of a seam extending from one end of the spoke to the other. The outer end of the spoke has a reduced part which may be fastened in several ways to the felloe, and the inner or hub end of the spoke has an enlarged wedge-shaped portion with two opposite tapered faces designed to engage the corresponding faces of the adjacent spokes, and provided on the opposite tapered faces with projections and depressions respectively adapted to interlock with corresponding depressions and projections of the adjacent spokes. In the preferred construction of the spokes the tapered faces are provided also with semi-cylindrical transverse depressions, which when the spokes are assembled, form with the similar depressions on the adjacent spokes, cylindrical openings adapted to accommodate bolts for clamping the hub portions of the spokes between the flanges of the hub.

This provides a spoke which aside from the interlocking and bolt hole features in the hub portions, is similar in appearance to an ordinary wooden spoke. But the spoke thus produced in tubular form from sheet metal with a longitudinally extending seam and with the hub portion adapted to interlock with the adjacent spokes, has advantages over wooden spokes in the way of increased strength and greater durability.

The present invention relates to the method of forming a spoke such as claimed in my prior application and briefly described above, and has for its object to provide a method by which the spoke may be formed effectively and inexpensively.

The invention may be briefly summarized as consisting in the novel steps of the improved method which are described in the specification, illustrated in the drawing, and set forth in the appended claims.

In the accompanying sheets of drawings showing the method in its preferred form, Fig. 1 is a face view of the blank which is cut away from a sheet of metal, and from which the complete spoke is formed; Fig. 2 is a plan view of the partially completed spoke consisting of a double or twin section which is produced from the blank in accordance with my process; Fig. 3 is a side elevation of the same; Fig. 4 is an end view looking toward the right of Fig. 3; Fig. 5 is an end view looking toward the left of Fig. 3; Figs. 6 and 7 are views corresponding to Figs. 4 and 5, illustrating the changes which are effected in the edge portions of the double or twin section by a subsequent operation; Figs. 8 and 9 are views corresponding to Figs. 2 and 3, showing the partially completed spoke at the end of a further spoke forming operation; Figs. 10 and 11 are end views of the partially completed spoke shown in Figs. 8 and 9 looking toward the right and toward the left respectively of Fig. 9; Figs. 12, 13, 14 and 15 are diagrammatic views illustrating steps or portions of a still further spoke forming operation, this operation closing the partially formed spoke and forming the seam between the edges of the blank after it has been converted to the form shown in Figs. 8 to 11; Fig. 16 is a plan view of the partially formed spoke after the closing and seam forming operation; Figs. 17 and 18 are end views of the same looking respectively toward the right and left of Fig. 16; Figs. 19 and 20 are respectively a plan and side elevation of the finished spoke as produced in the final spoke forming operation; Fig. 21 is an end view of the same looking toward the left of Fig. 20; and Figs. 22 and 23 are respectively an end view and a plan view of the hub portion of the finished spoke showing a slight modification.

In the blanking out process, flat blanks such as shown at 10 in Fig. 1 are punched out from a strip of sheet metal of the proper gauge, preferably sheet steel. An ordinary punch press may be used for this purpose. It will be observed that this blank is wider at one end than at the other, and that at one end, i. e. the left hand end as shown in Fig. 1, the blank has a reduced portion 10ᵃ which is utilized in forming the reduced end of the spoke which is adapted to be fitted to the felloe. Next there is an outwardly flared portion 10$^b$ which forms the slightly tapered body portion of the spoke. Next there is an outwardly flared portion 10$^c$, which forms the outwardly flared part of the spoke leading to the enlarged wedge-shaped hub portion, and next there is the portion 10$^d$ which is inwardly flared and forms the tapered or wedge-shaped hub portion, the two opposite tapered faces of which are adapted to engage and to be interlocked with the similar portions of adjacent spokes as already stated.

From this blank the spoke is formed by several distinct spoke forming operations, in the first of which, the partially formed spoke illustrated in Figs. 2 to 5 is formed by dies which form no part of the present invention. While the partially formed spoke illustrated in these figures is stated to be formed by the first spoke forming operation it is not to be inferred that the article here illustrated is produced by one stroke of the press and by one drawing operation as the drawing may be done gradually in a succession of steps which, however, for convenience are described as the "first forming operation." Additionally, for convenience the other partially formed spokes and finally the completed spoke herein illustrated are described as produced by the second, third, fourth, fifth and sixth spoke forming operations but one or more of these operations may each be performed in a series of steps. It will be observed that this partially formed spoke, which will be designated by the reference character A, is formed in effect in a double or twin section, substantially symmetrical about a longitudinal center line, the two halves of this double but one-piece section being separated by a longitudinal groove or depression 11 extending from the hub end up to but not through the felloe end shown at the left hand end of the partially formed spoke. That is to say, this longitudinal depression extends substantially but not quite the full length of the partially formed spoke. In this operation the felloe end designated 12 is roughly formed, the body portion designated 13, formed in two halves on opposite sides of the depression are shaped up, the spoke is flared outwardly as shown at 14, joining the body portions 13 and the enlarged tapered or wedge shaped portions 15. Likewise in this operation there are formed on the faces 16 which subsequently become the opposite relatively tapered faces of the wedge-shaped hub portion, an interlocking depression 17 and an interlocking projection 18. Adjoining the depression and projection 17 and 18 are formed depressions 19 substantially semi-circular in form, which depressions are utilized to accommodate the hub bolts as already explained. On opposite sides of the depression 17 and depression 19 of one enlarged portion 15, and on opposite sides of the projection 18 and depression 19 of the other half, the metal is flat, and in the same tapered plane, but at the extreme end of the hub portion on both halves and leading from the hub end to the depressions 19 are convex portions 20 which flare outwardly toward the hub end as shown in Fig. 2.

Additionally this partially formed spoke A is provided along its longitudinal edges with marginal portions 21 and 22 which in the next operation are given the proper shape so that they may be formed into the seam. In the second spoke forming operation the partially formed spoke designated B in Figs. 6 and 7 is formed. In Figs. 6 and 7 I have illustrated simply the ends of the partially formed spoke B, since the plan and side elevation thereof are substantially like the plan and side elevation of the partially formed spoke A produced by the first spoke forming operation and illustrated in Figs. 2 and 3. In producing the partially formed spoke A in the first spoke forming operation, due to the drawing of the metal, the edges or marginal portions 21 and 22 are of irregular shape, and there is usually a surplus of metal. In the second spoke forming operation the surplus metal is cut off and the edges are trimmed and also given the shape illustrated in Figs. 6 and 7 wherein one edge designated 23 is extended upwardly, and the other designated 24 is extended downwardly to adapt these edges for the bead forming operation. Likewise, in this second spoke forming operation the corners at the hub portion are formed sharp, all depressions and projections at the hub portion, thoroughly formed. Likewise in this operation the partially formed spoke is given a smooth finish and all wrinkles are pressed out. Suitably shaped dies are utilized to perform these several functions and to accomplish the results as stated.

In the third spoke forming operation the partially formed spoke B is converted to the partially formed spoke C designated in Figs. 8 to 11. It will be observed that in this operation the two halves of the double section are nearly closed, and that in this operation the device substantially assumes the form of the finished spoke, that is to say, though the edges or marginal portions 23 and 24 are brought up close to each other, as most clearly shown in Figs. 10 and 11, they are still separated by a slot extending the full length of the partially formed spoke C, but the felloe end, here designated 25 is brought into substantially circular shape, the body portion here designated 26 is made into nearly the finished tapered tubular shape, and the wedge-shaped hub portion here designated 27 is brought to substantially its form. However, the sides of the hub portion of the partially formed spoke C, which sides in the finished spoke become parallel, are tapered on opposite sides of the center line, the taper corresponding to the gap existing between the marginal portions 23 and 24.

Figure 13:
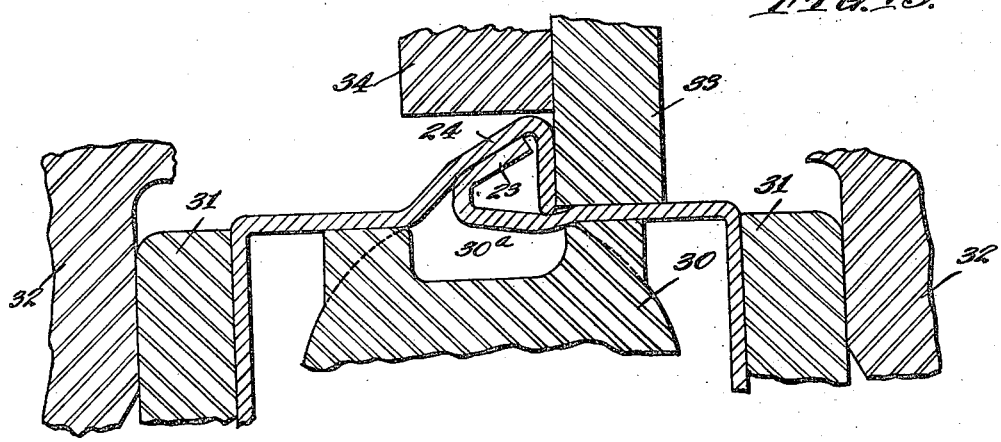
Figure 14:
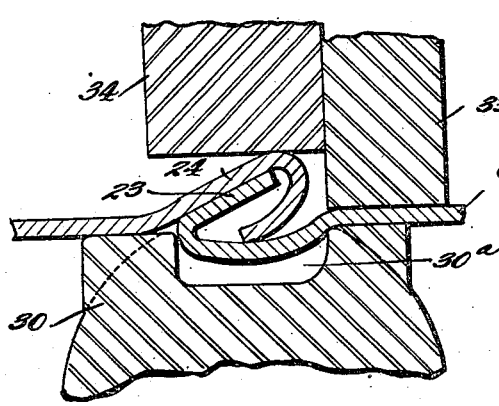
Figure 15:
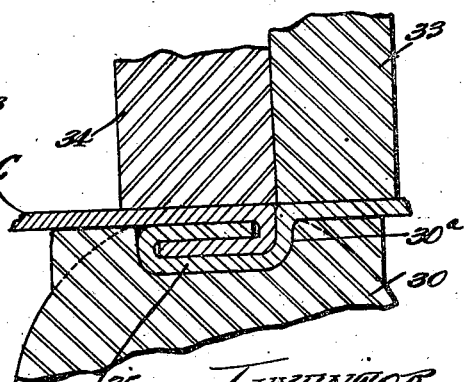

We come next to the closing and seam forming operation which is the fourth spoke forming operation wherein the partially completed spoke designated D in Figs. 16 to 20 is formed. As this operation is extremely important to the effectiveness of the spoke, in the way of strength and durability as well as design and appearance, the steps or portions of this operation have been fully illustrated in the diagrammatic views of Figs 12 to 15. In this operation special dies are utilized, and while these dies constitute the subject matter of a companion application, I have shown a portion thereof so that the closing and bead forming operation will be better understood. In this operation a mandrel 30 is utilized having along the top a longitudinally extending slot $30^a$ in which the seam is formed. The partially closed, partially formed spoke C is slipped onto this mandrel which lies between a pair of jaws 31, shaped to correspond to the outline of the finished spoke. These jaws which in the preferred construction of the dies are pivoted at one end, are swung inward by cams 32 carried by the upper die, so that as the upper die descends, the first operation is to close the tubular spoke, bringing the edges 23 and 24 together, or in contact with each other, as shown in Fig. 12. As the upper die continues to descend, one of two relatively slidable punches which operate in sequence is operated. The punch which is first operated, is designated 33, this punch engaging with a portion of the edge 24 of the metal which projects beyond the edge 23, bending it downward as illustrated in Fig. 13. Then the second punch which is designated 34, descends in the manner illustrated in Fig. 14, and presses the edges or marginal portions 23 and 24 into the slot $30^a$ of the mandrel, and on the completion of the stroke forms the finished seam which is designated 35 in Fig. 15. This seam extends the full length of the spoke and forms a double lock which holds the metal against spreading or pulling apart and immensely strengthens the spoke, as will be readily understood.

On the retraction of the upper die, the jaws spread apart and the partially formed spoke D is stripped from the mandrel. This partially formed spoke D is substantially the completed spoke, and it differs from the completed spoke only in the respect that at the extreme hub end, i. e. beyond the hub bolt depressions 19 it is curved about the longitudinal axis of the spoke as indicated at 36, this curvature being on two opposite sides of the hub end of the spoke, while the other two sides at the hub end are flat and parallel, as clearly indicated in Fig. 20. The purpose of forming the hub end of the spoke with the two opposite curved sides 36, is to permit the partially formed spoke D to be stripped from the mandrel 30. The large end of the mandrel corresponds to the shape of the partially formed spoke D at its hub end as illustrated in Fig. 20, so that the partially formed spoke D can be slipped from the mandrel, following the fourth spoke forming operation illustrated in Figs. 12 to 15.

In the fifth spoke forming operation the hub end of the spoke is compressed in a special sizing die, the sole function of which is to flatten out the curvatures 36 shown in Figs. 16 and 20, so as to convert them to flat faces tapered in conformity with the taper of these faces beyond the hub bolt depressions. As already stated, these tapered faces on opposite sides of the hub portions of the spoke are designed to engage the corresponding tapered faces of the adjacent spokes, and therefore the angle of these tapered faces of each spoke will depend upon the number of spokes in the wheel.

In this operation there is, therefore produced the finished spoke E which I have illustrated in Figs. 19, 20 and 21. Although the details of this spoke are claimed in my application Serial No. 487,292, filed July 25, 1921, it might be stated in conclusion that this finished spoke is provided with a reduced felloe end, which is adapted to engage the felloe and may be secured thereto in any suitable way; also the slightly tapered tubular body $d'$ beyond which is the outwardly flared part $d^2$ adjoining the wedge-shaped hub portion $d^3$ which hub portion has two opposite flat faces which are adapted to be clamped against the inner faces of the flanges of the hub; and two tapered faces which are tapered from the end of the outwardly flared portion $d^2$ to the extreme hub end of the spoke. In these tapered faces there are the semi-circular hub bolt depressions $d^4$ which when the spokes are assembled, form cylindrical openings for the hub bolts, and likewise there are formed in one of these tapered faces a depression indicated at $d^5$, and on the other tapered face a projection indicated at $d^6$. It is understood that the depressions $d^5$ and the projections $d^6$ of the several spokes interlock when the spokes are assembled, locking the spokes against relative movement, and also aligning them to the planes of the inner faces of the hub flanges.

It will be observed from Figs. 19, 20 and 21 that the depression $d^5$ and the projection $d^6$ of the interlock are located outwardly in the direction of the hub end from the hub bolt depression $d^4$ while the remainder of the tapered faces are flat or uninterrupted. It may be desirable to provide the interlocking depression and extension also on those portions of the tapered faces located toward the hub end from the hub bolt depressions $d^4$ in order to provide an additional interlock. In other words, the depression $d^5$ and the projection $d^6$ would then extend for the full length of the tapered faces, except for the hub bolt depressions $d^4$. This modified construction I have illustrated in Figs. 22 and 23, wherein I have shown simply the hub end of the spoke which I have designated by the reference character D'.

While I have shown the preferred method of forming the spoke, wherein after the blank is punched from the strip of sheet metal the spoke is formed by five spoke forming operations wherein deformations are made and various other operations are performed, and while as I now believe, the spoke can best be formed by these operations, in each of which a distinct step toward the completion of the spoke is accomplished, nevertheless, I do not desire to be confined to the precise number of operations, or to the precise details or features of the operations described, but aim in my claims to cover all modifications which do not involve a departure from the spirit and scope of the invention as set forth in the appended claims.

Having described my invention, I claim:

1. The method of forming a tubular sheet metal spoke which comprises deforming a suitably shaped blank so as to produce a partially formed spoke in a double or twin section, the halves of which are substantially symmetrical about a longitudinal center line and divided by a longitudinally extending groove or depression, and subsequently closing together the two halves and securing their edges together.

2. The method of forming a tubular one-piece sheet metal spoke with an enlarged tapered hub portion, which comprises pressing and drawing a blank so as to produce an open twin or double one-piece section, each half thereof adapted to form substantially one-half of the completed spoke, and subsequently closing the two halves together and locking their edges in the form of a seam extending lengthwise of the spoke.

3. The method of forming a tubular sheet spoke with an enlarged wedge-shaped hub portion, which comprises deforming a properly shaped blank so as to produce a double or twin one-piece section, each half thereof corresponding substantially to the shape of one-half of the spoke, the section thus formed being substantially symmetrical about the longitudinal center line thereof, and subsequently closing the two halves and uniting their edges in the form of a seam extending longitudinally of the spoke.

4. The method of forming a tubular sheet metal one-piece spoke with an enlarged wedge-shaped hub portion, which comprises deforming a suitably shaped blank so as to produce a double or twin one-piece section, each half thereof corresponding in shape to substantially one-half the spoke, closing the two halves together and uniting their edges on an inner mandrel, withdrawing the partially formed spoke from the mandrel and subsequently forming the hub end into the final wedge-shaped form.

5. The method of forming a tubular sheet metal one-piece spoke with an enlarged wedge-shaped hub portion, which comprises deforming a suitably shaped blank into a double or twin one-piece section substantially symmetrical about a longitudinal center line thereof, trimming and shaping the edges thereof so that they may be interlocked, bringing the two halves together, and locking their edges in the form of a seam extending the length of the spoke.

6. The method of forming a tubular sheet metal one-piece spoke with an enlarged wedge-shaped hub portion, which comprises deforming a suitably shaped blank into a double or twin one-piece section substantially symmetrical about a longitudinal center line thereof, trimming and shaping the edges thereof so that they may be interlocked, bringing the two halves together, locking their edges in the form of a seam extending the length of the spoke, withdrawing the partially formed spoke from the mandrel, and subsequently reducing and shaping the hub end of the spoke.

7. The method of forming a tubular sheet metal one-piece spoke for a vehicle wheel, which comprises deforming a properly shaped blank so as to form a double or twin one-piece section substantially symmetrical about the longitudinal center line, each half corresponding substantially to one-half the completed spoke, and including a tapered body portion and an enlarged hub portion, and closing the two halves together and uniting their edges.

8. The method of forming a tubular sheet metal one-piece spoke for vehicle wheels, which comprises deforming a suitably shaped blank so as to provide a double or twin one-piece section substantially symmetrical about the longitudinal center line, each corresponding in shape substantially to one-half the shape of the spoke to be formed, and each being provided with a body forming portion and with an enlarged hub forming portion, the hub forming portions of the two halves having similar transverse depressions, and subsequently bringing the two halves together and uniting their edges.

9. The method of forming a tubular sheet metal one-piece spoke for vehicle wheels, which comprises deforming a suitably shaped blank so as to provide a double or twin one-piece section substantially symmetrical about the longitudinal center line, each corresponding in shape to substantially one half the spoke to be formed, and each being provided with a body forming portion and with an enlarged hub forming portion, the hub forming portions of the two halves having similar transverse depressions, subsequently bringing the two halves together and uniting their edges in the form of a locked seam, the seam being formed in a mandrel, and subsequently withdrawing the partially formed spoke from the mandrel, and reducing and re-shaping the hub end.

In testimony whereof, I hereunto affix my signature.

THOMAS N. AIKENS.